United States Patent
Roy et al.

(10) Patent No.: US 12,436,679 B2
(45) Date of Patent: Oct. 7, 2025

(54) METHOD AND DEVICE OF ACCESSING MEMORY WITH NEAR MEMORY ACCELERATOR

(71) Applicant: SAMSUNG ELECTRONICS CO., LTD., Suwon-si (KR)

(72) Inventors: Arnab Roy, Bengaluru (IN); Saptarsi Das, Bengaluru (IN); Kiran Kolar Chandrasekharan, Bengaluru (IN); Yeongon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/439,092

(22) Filed: Feb. 12, 2024

(65) Prior Publication Data

US 2024/0311009 A1    Sep. 19, 2024

(30) Foreign Application Priority Data

Feb. 13, 2023 (IN) .............................. 202341009525
Jun. 2, 2023 (KR) ........................ 10-2023-0071830

(51) Int. Cl.
*G06F 3/06* (2006.01)

(52) U.S. Cl.
CPC ............ *G06F 3/061* (2013.01); *G06F 3/0629* (2013.01); *G06F 3/0673* (2013.01)

(58) Field of Classification Search
CPC ....... G06F 3/061; G06F 3/0629; G06F 3/0673
See application file for complete search history.

(56) References Cited

U.S. PATENT DOCUMENTS

| 6,070,227 A | 5/2000 | Rokicki |
| 7,844,785 B2 | 11/2010 | Skerlj et al. |
| 8,108,596 B2 * | 1/2012 | Aldworth ............ G06F 12/0653 711/E12.003 |
| 10,203,878 B2 | 2/2019 | Haller et al. |
| 11,249,651 B2 | 2/2022 | Salamat et al. |

(Continued)

FOREIGN PATENT DOCUMENTS

KR    10-2016-0040289 A    4/2016

OTHER PUBLICATIONS

Rixner, Scott, et al. "Memory Access Scheduling." ISCA-27, Computer Systems Laboratory, Stanford University, 2000, (11 pages).

(Continued)

*Primary Examiner* — Yong J Choe
(74) *Attorney, Agent, or Firm* — NSIP Law (57) ABSTRACT

Disclosed are a method of accessing a memory and an electronic device for performing the method. The electronic device includes a processor, and a memory electrically connected to the processor, wherein the processor may be configured to select a rank including bank groups of the memory, select a bank corresponding to a memory address to be accessed from among banks included in the selected rank, select a row and one or more columns from rows and columns of the selected bank corresponding to the memory address, and generate the memory address to access the memory based on an address mapping scheme according to the selected rank, the selected bank, the selected row, and the selected one or more columns.

10 Claims, 9 Drawing Sheets

(56) References Cited

U.S. PATENT DOCUMENTS

| | | | |
|---|---|---|---|
| 2015/0089183 A1* | 3/2015 | Bains | G06F 12/0292 |
| | | | 711/202 |
| 2018/0284994 A1 | 10/2018 | Haller et al. | |
| 2019/0212918 A1 | 7/2019 | Wang et al. | |
| 2021/0124500 A1 | 4/2021 | Salamat et al. | |
| 2021/0271680 A1 | 9/2021 | Lee et al. | |

OTHER PUBLICATIONS

Ipek, Engin, et al. "Self-Optimizing Memory Controllers: A Reinforcement Learning Approach." ACM Sigarch Computer Architecture News 36.3, 2008, (12 pages).

Zhang, Jialiang, et al., "Software-Defined Address Mapping: A Case on 3d Memory." Proceedings of the 27th ACM International Conference on Architectural Support for Programming Languages and Operating Systems. 2022., (14 pages).

* cited by examiner

METHOD AND DEVICE OF ACCESSING MEMORY WITH NEAR MEMORY ACCELERATOR

CROSS-REFERENCE TO RELATED APPLICATIONS

This application claims the benefit under 35 USC § 119(a) of Indian Patent Application No. 202341009525 filed on Feb. 13, 2023, in the Indian Patent Office, and Korean Patent Application No. 10-2023-0071830 filed on Jun. 2, 2023, in the Korean Intellectual Property Office, the entire disclosures of which are incorporated herein by reference for all purposes.

BACKGROUND

1. Field

The following disclosure relates to a method and device of accessing memory with a near memory accelerator.

2. Description of Related Art

Many memory-intensive workloads are used in various applications such as artificial intelligence (AI)/machine learning (ML), big data, etc. Frequent communication is required between a processor (such as a central processing unit (CPU)) and a memory (such as dynamic random-access memory (DRAM)) to perform a large amount of DRAM access. Also, high bandwidth is required to transfer data between the processor and a memory subsystem. Such type of access reduces system performance and increases system power consumption.

Further, a typical server-based complex processing logic may achieve high throughput for compute-intensive workloads, but such a logic may face severe performance degradation due to either high memory capacity or bandwidth requirement for memory-intensive workloads.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a processor, and a memory electrically connected to the processor, wherein the processor may be configured to select a rank including bank groups of the memory, select a bank corresponding to a memory address to be accessed from among banks included in the selected rank, select a row and one or more columns from rows and columns of the selected bank corresponding to the memory address, and generate the memory address to access the memory based on an address mapping scheme according to the selected rank, the selected bank, the selected row, and the selected one or more columns.

The processor may be further configured to select a channel to access a near memory accelerator (NMA) included in the memory, the channel selected from among channels connected to the memory.

The processor may be further configured to generate a column identity corresponding to the selected one or more columns, wherein a width of the column identity may be greater than a width of a set byte offset, and the column identity may be set such that it is not to be repeated within a set wrap around window.

The selected row may correspond to a row hit for all write addresses.

The processor may be further configured to select banks from different bank groups among the bank groups included in the selected rank.

In another general aspect, a method of accessing a memory includes selecting a rank including bank groups of a memory, selecting a bank corresponding to a memory address to be accessed, the bank selected from among banks included in the selected rank, selecting a row and one or more columns from among rows and columns of the selected bank corresponding to the memory address, and generating the memory address to access the memory based on an address mapping scheme according to the selected rank, the selected bank, the selected row, and the selected one or more columns.

The method may further include selecting a channel to access an NMA included in the memory, from among channels connected to the memory.

The method may further include generating a column identity corresponding to the selected one or more columns, wherein a width of the column identity may be greater than a width of a set byte offset, and the column identity may be set not to be repeated within a set wrap around window.

The selected row may correspond to a row hit for all write addresses.

The selecting of the bank may include selecting a plurality of banks from different bank groups among the bank groups included in the selected rank.

Other features and aspects will be apparent from the following detailed description, the drawings, and the claims.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

To improve performance in memory-intensive workloads, methods of placing a processing logic near an off-chip (non-host) memory may be used. The methods of placing a processing logic near an off-chip memory may be categorized into (1) a method of processing outside memory that uses a near-memory accelerator (NMA) in which a processing logic includes digital circuits and is placed outside but logically close to a memory block, and (2) a method of processing in memory in which a processing logic may be analog or mixed circuits that are placed inside a memory block (and generally, integrated with the memory functionality). These two techniques exploit the higher bandwidth of off-chip memory and may address the memory bandwidth issue due to the limited number of pins in recent memory systems like a dual inline memory module (DIMM). An NMA may alleviate memory capacity concerns, and the internal circuits of a memory block may remain unchanged.

Though NMA hardware improve system performance by exploiting the internal bandwidth of DRAM, the performance may be significantly improved further if predetermined constraints on the addressing of input workloads are added. Such constraints on addressing may be maintained by modifying a memory controller (MC) logic of an operating system executing on a host central processing unit (CPU). However, such modification of the memory controller logic is useful only for NMA-enabled DRAM devices.

Further, with NMA technology, a significant amount of modification may be required in a host processor or system-on-chip (CPU SOC) in order to maintain the overall system design and avoid over-complication. However, as a host MC is one of the most complicated modules inside the host CPU (or a SOC device), it may not be easy to modify the logic or design of the host MC. Hence, to make a system design agnostic to the host CPU, the host CPU may be designed typically to be unaware of the existence of an NMA inside the memory system.

Figure 1:
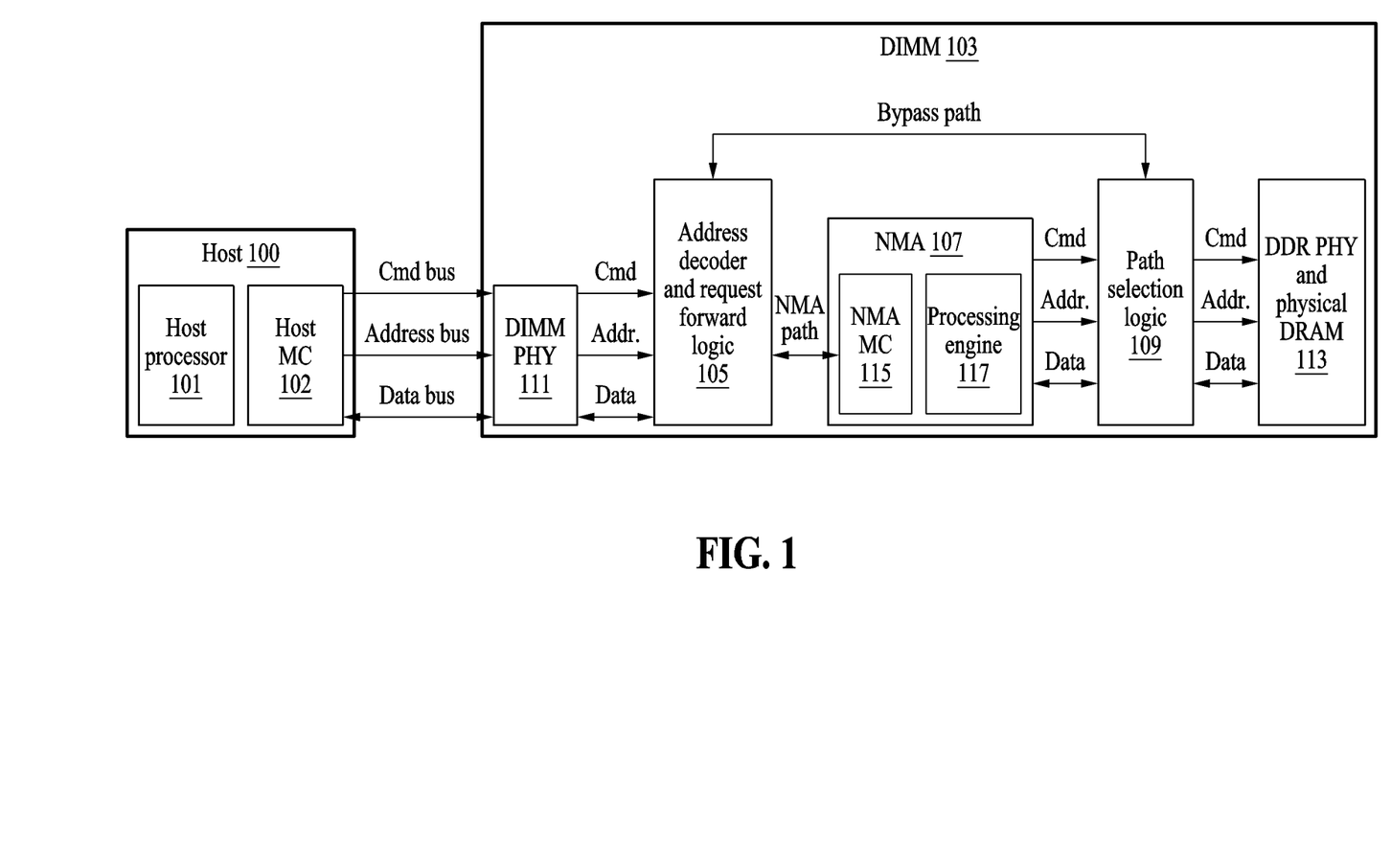
FIG. 1 illustrates a memory access method using a near-memory accelerator (NMA), according to one or more embodiments.

FIG. 1 illustrates a memory access method using an NMA, according to one or more embodiments. In the following description, "PHY" is short for "physical".

As shown in FIG. 1, a host 100 may include a host processor 101 and a host MC 102. The host 100 may be coupled to a dual inline memory module (DIMM) 103. The DIMM 103 may include DIMM PHY 111, an address decoder and request forward logic (105), an NMA 107, a path selection logic 109, and a DDR PHY and physical DRAM 113.

The host MC 102 may transmit a memory access request of the host processor 101 to the DIMM PHY 111. Specifically, the host MC 102 may transmit commands and memory addresses through a Cmd bus and an Address bus. The host MC 102 may transmit data to be written in the memory to the DIMM PHY 111 through a Data bus (when the memory access request includes a write command) or receive data read from the memory from the DIMM PHY 111 (when the memory access request includes a read command).

The DIMM PHY 111 may transmit the memory access request to the address decoder and request forward logic 105. The DIMM PHY 111 may transmit the commands and the memory addresses to the address decoder and request forward logic 105. According to memory access commands (e.g., read or write), the DIMM PHY 111 may transmit data to the address decoder and request forward logic 105 or receive data from the address decoder and request forward logic 105.

The address decoder and request forward logic 105 may either (i) transmit the memory access request (in the case of an NMA request) to the NMA 107 through an NMA path or (ii) transmit the memory access request to the DDR PHY and physical DRAM 113 through a bypass path (in the case of a Host request).

The NMA 107 may include an NMA MC 115 and a processing engine 117. The NMA MC 115 may process NMA requests. The NMA requests may include load/store instructions for the NMA 107. The processing engine 117 may include a data path to process the data received from DRAM. The processing engine 117 may accelerate data processing by exploiting the high internal bandwidth of the DRAM.

The host 100 may transmit NMA instructions to the NMA 107 via the host MC 102, as write (WR) commands where WR addresses are reserved addresses (e.g., associated with NMA operations). The NMA instructions may be packed into WR data.

Figure 2:
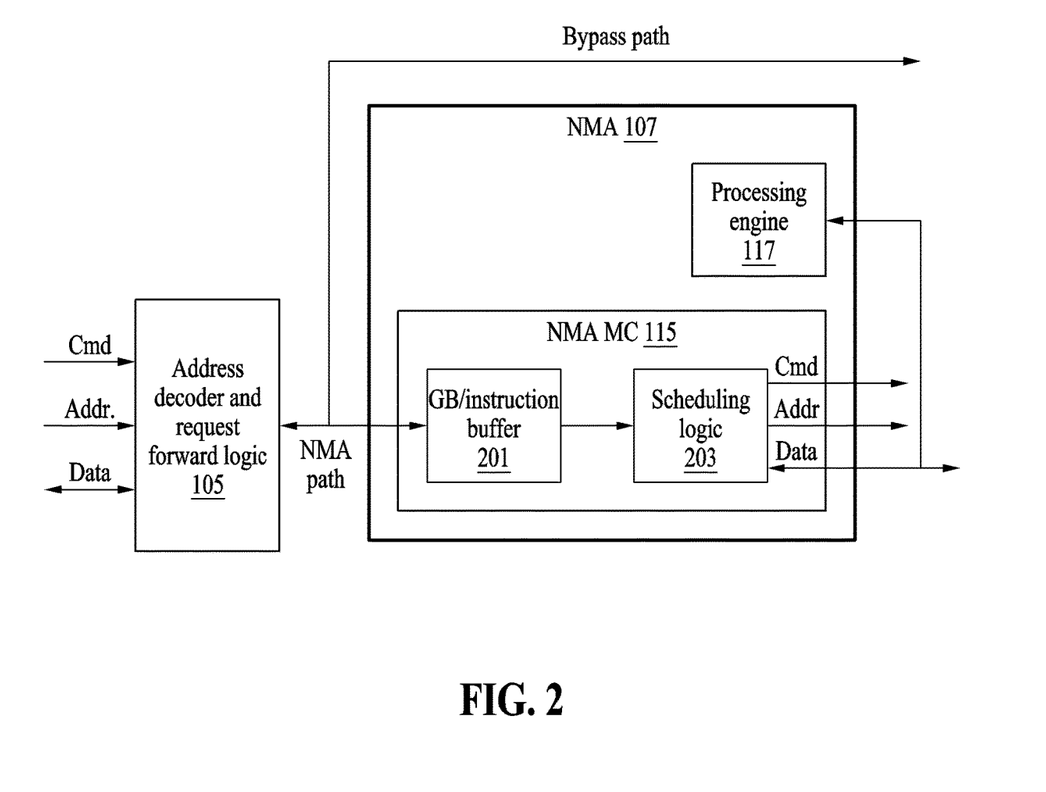
FIG. 2 illustrates an NMA device, according to one or more embodiments.

FIG. 2 illustrates the NMA 107, according to one or more embodiments.

As shown in FIG. 2, the NMA MC 115 may include a global buffer (GB)/instruction buffer 201 and a scheduling logic 203.

The GB/instruction buffer 201 may provide storage for the NMA load/store instructions. The scheduling logic 203 may include, for example, finite state machines (FSM), arbitration logic, and additional storage for NMA instructions. The scheduling logic 203 may fetch the NMA instructions from the GB/instruction buffer 201. The scheduling logic 203 may translate the NMA instructions into appropriate DRAM commands and schedule the generated DRAM commands.

The throughput of the NMA MC 115 may be dependent on the rate of delivery of NMA instructions from the host MC 102 to the GB/instruction buffer 201 and the rate of processing of NMA instructions in the GB/instruction buffer 201.

The rate of processing of NMA instructions in the GB/instruction buffer 201 may depend on the row buffer locality (row buffer locality is described later). When the row buffer locality is used, the GB/instruction buffer 201 may allow a DRAM row to be kept open while processing the NMA instructions to perform multiple read (RD) and WR on the open row. When multiple RD and WR on the open row is performed while the DRAM row is kept open, the throughput of the NMA MC 115 may be improved by eliminating some of the overhead of activate (ACT) and precharge (PRE) commands which are used to open and close the DRAM row.

The throughput of the NMA MC 115 may be affected by two factors related to the row buffer locality. For example, the two factors related to the row buffer locality may include the row buffer locality among the NMA instructions and the effectiveness of the NMA MC 115 in exploiting the available row buffer locality.

The row buffer locality among the NMA instructions may indicate (and correspond to) the degree of row buffer locality available in an NMA instruction sequence in the GB/instruction buffer 201. The effectiveness of the NMA MC 115 may depend on how efficient the scheduling logic 203 is in exploiting the row buffer locality.

Other factors affecting the throughput of the NMA MC 115 may include available bank parallelism, the effectiveness of the NMA MC 115 in exploiting bank parallelism, etc.

The row buffer locality may result in a row hit. When accessing to the memory in response to a row hit, there is no need for closing and opening a row of a bank (which may already be open). Hence, the DRAM throughput may be significantly improved. The host MC 102 may include an intelligent scheduling logic to exploit the row buffer locality. The host MC 102 may shuffle requests that it is processing according to the intelligent scheduling logic.

Since the host MC 102 is unaware of or does not consider the existence of the NMA 107 inside the DIMM 103, the scheduling logic of the host MC 102 may negatively impact the performance of the NMA 107. If the NMA instruction sequence before shuffling has a high row buffer locality, it may be desirable that the host MC 102 does not shuffle the NMA instructions adversely, where the degree of row buffer locality is reduced.

Further, a scheduling algorithm of the host MC 102 may be typically configured to optimize performance of off-chip memory (like DRAM). The scheduling algorithm may cause underperformance by shuffling without knowledge about the memory access traffic of the NMA 107.

In order to preserve the actual traffic of the NMA 107 (e.g., the original sequence of NMA requests generated by the host processor 101), in some cases the shuffling according to the scheduling algorithm of the host MC 102 should not be performed as it would degrade NMA-based performance.

Figure 3:
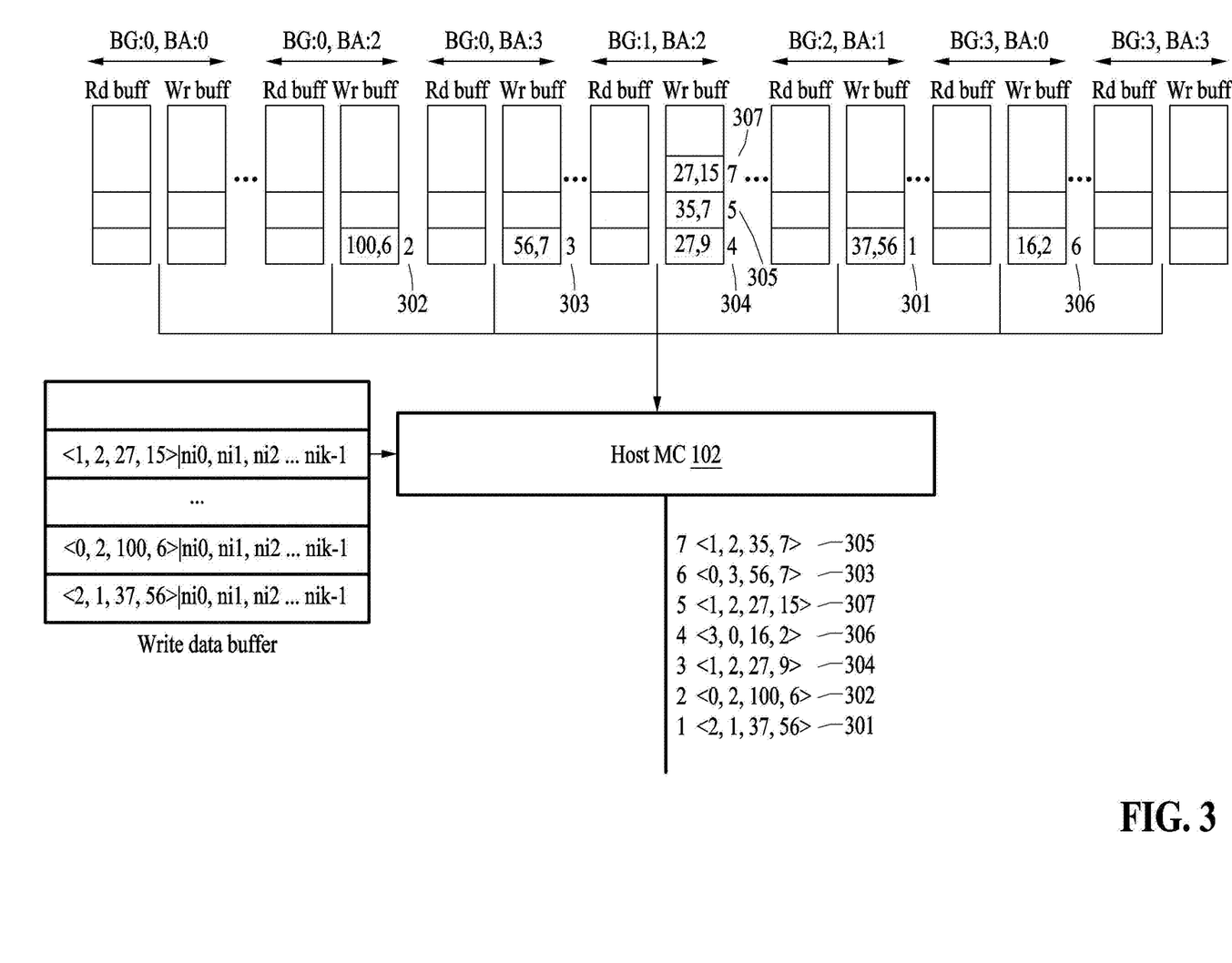
FIG. 3 illustrates an example of shuffling NMA instructions by a host memory controller (MC), according to one or more embodiments.

FIG. 3 illustrates an example of shuffling NMA instructions by the host MC 102, according to one or more embodiments. NMA instructions may be referred to as memory access requests (requests that will eventually be processed through the NMA 107).

In FIG. 3, the memory access requests 301, 302, 303, 304, 305, 306, and 307 may arrive at the host MC 102 in the sequence: (1) first memory access request 301, (2) second memory access request 302, (3) third memory access request 303, (4) fourth memory access request 304, (5) fifth memory access request 305, (6) sixth memory access request 306, and (7) seventh memory access request 307. In FIG. 3, the first memory access request 301, for example, may be a request for a bank group 2 (BG 2), a bank array 1 (BA 1), a row ID 37 (RO ID 37), and a column ID 56 (CO ID 56), and the order of parameters is the same for the second to seventh memory access requests 302 to 307 (i.e., <bank group, bank array, row ID, and column ID>).

The host MC 102 may shuffle the memory access requests 301, 302, 303, 304, 305, 306, and 307 and transmit the memory access requests 301, 302, 303, 304, 305, 306, and 307 to the DIMM 103 in the shuffled sequence (shown in FIG. 3). How the shuffle order is determined is described later. The host MC 102 may transmit the memory access requests 301, 302, 303, 304, 305, 306, and 307 to the DIMM 103 in the sequence of the first memory access request 301, the second memory access request 302, the fourth memory access request 304, the sixth memory access request 306, the seventh memory access request 307, the third memory access request 303, and the fifth memory access request 305.

The first memory access request 301 and the second memory access request 302 may be transmitted to the DIMM 103 in the same sequence in which they arrive at the host MC 102. Since the third memory access request 303 arrives at the host MC 102 earlier than the fourth memory access request 304 and has the same bank group as the second memory access request 302, the host MC 102 may transmit the fourth memory access request 304 belonging to another bank group instead of the third memory access request 303 according to the scheduling algorithm.

When the fifth memory access request 305, the sixth memory access request 306, and the seventh memory access request 307 arrive, the host MC 102 may select the third memory access request 303 or the sixth memory access request 306 since the fourth memory access request 304, the fifth memory access request 305, and the seventh memory access request 307 have the same bank group ID. FIG. 3 shows an example of transmitting the sixth memory access request 306 fourthly by the host MC 102.

Since the fourth memory access request 304 and the seventh memory access request 307 belong to the same row 27 of a bank 2 of a bank group 1, the host MC 102 may transmit the seventh memory access request 307 fifthly to exploit a row hit. Since the third memory access request 303 and the fifth memory access request 305 belong to different bank groups, the host MC 102 may transmit the third memory access request 303 earlier than the fifth memory access request 305 and transmit the fifth memory access request 305 seventhly.

As shown in FIG. 3, the host MC 102 may shuffle the NMA instructions using its own scheduling algorithm, which is oblivious of any effect rescheduling may have on NMA processing. That is, since the host MC 102 shuffles the NMA instructions, the sequence in which the NMA instructions arrive at the host MC 102 may differ from the sequence in which the NMA instructions are transmitted from the host MC 102.

Figure 4:
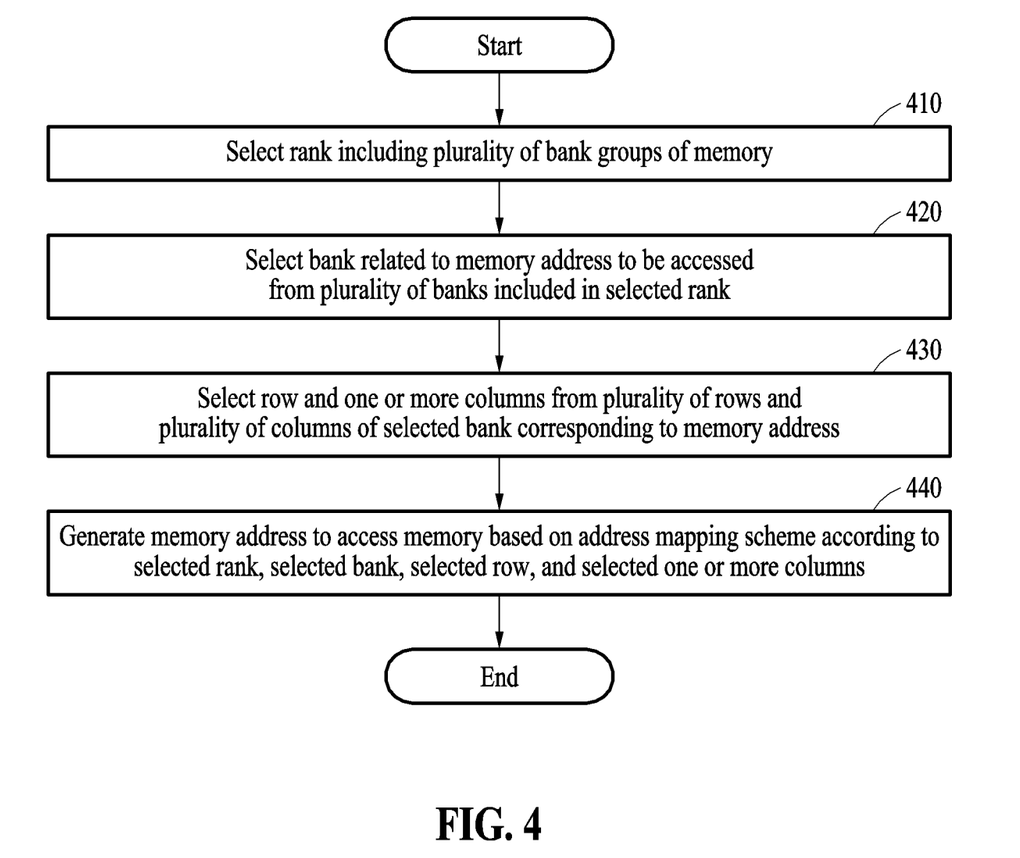
FIG. 4 illustrates example operations for performing a memory access method by an electronic device, according to one or more embodiments.

FIG. 4 illustrates examples of operations of performing a memory access method, according to one or more embodiments.

Referring to FIG. 4, in operation 410, an electronic device may select (or determine) a ranking including multiple ranked bank groups of a memory. The ranking may include the multiple bank groups. Each of the bank groups may include multiple banks.

For example, the electronic device may select (or determine) the ranking according to a ranking selection logic.

For example, when the memory is DRAM, the memory may include multiple ranks, and each of the ranks may include a respective plurality of banks. For example, the DRAM may have a rank 0 and a rank 1.

In determining memory addresses to access the memory, if a rank corresponding to each memory address is selected arbitrarily, then a host MC may shuffle the sequence of memory access requests. Accordingly, when a rank corresponding to each memory address is arbitrarily selected, the sequence of memory addresses according to the sequence of memory access requests may be shuffled.

In addition, the selected rank may include a respective plurality of bank groups (e.g., a bank group 1 (BG 1), a bank group 2 (BG 2), a bank group 3 (BG 3), a bank group 4 (BG 4), etc. Each BG may include a respective plurality of banks or bank arrays (e.g., a bank 1 (BA 1), a bank 2 (BA 2), a bank 3 (BA 3), a bank 4 (BA 4), etc.).

In an example, the electronic device may select a channel from among multiple channels connected to the memory (e.g., DRAM). The electronic device may select a channel (from among the multiple channels) before selecting the rank.

As an example, the memory may include DIMM PHY (e.g., the DIMM PHY 111 of FIG. 1), an address decoder and request forward logic (e.g., the address decoder and request forward logic 105 of FIG. 1), an NMA (e.g., the NMA 107 of FIG. 1 or FIG. 2), a path selection logic (e.g., the path selection logic 109 of FIG. 1), and a DDR PHY and physical DRAM (e.g., the DDR PHY and physical DRAM 113 of FIG. 1). The NMA may be accessed through a selected channel.

For example, the electronic device may select a channel from among multiple channels according to a channel selection logic.

In operation 420, the electronic device may select a bank related to a memory address to be accessed from a plurality of banks included in the selected rank. As an example, the electronic device may select one or more banks from the plurality of banks.

Each bank and/or bank array may include a respective plurality of rows and a respective plurality of columns for a corresponding memory address.

For example, the electronic device may select a bank from a plurality of banks included in a plurality of bank groups according to a bank group and bank selection logic.

In operation 430, the electronic device may select a row and one or more columns from a plurality of rows and a plurality of columns of the selected bank corresponding to the memory address.

For example, a bank 1 (BA 1) may include a plurality of rows (e.g., a row 0 (RO 0), a row 1 (RO 1), a row 2 (RO 2), a row 3 (RO 3), etc.). For example, the bank 1 (BA 1) may include a plurality of columns (e.g., a column 0 (CO 0), a column 1 (CO 1), a column 2 (CO 2), a column 3 (CO 3), etc.).

The electronic device may select one row from the plurality of rows of the bank and one or more columns from the plurality of columns of the bank.

For example, the electronic device may select a row of a first memory access request as RO 37, a column of the first memory access request as CO 27, a row of a second memory access request as RO 37, a column of the second memory access request as CO 27, a row of a third memory access request as RO 37, and a column of the third memory access request as CO 45. As described above, the electronic device may select rows of memory access requests such that memory addresses of all the memory access requests (e.g., write requests or read requests) correspond to hit row addresses.

For example, the electronic device may select one row from the plurality of rows and one or more columns from the plurality of columns according to an array selection logic.

For example, the electronic device may select one row from the plurality of rows according to a row selection logic. The electronic device may select one or more columns from the plurality of columns according to a column selection logic.

In operation 440, the electronic device may generate the memory address to access the memory based on an address mapping scheme according to the selected rank, the selected bank, the selected row, and the selected one or more columns.

For example, the electronic device may generate a memory address including <bank group, bank, row, column>. The electronic device may generate memory addresses such as <2, 1, 37, 27>, <2, 1, 37, 45>, <2, 1, 37, 16>, <2, 1, 37, 5>, <2, 1, 37, 23>, <2, 1, 37, 57>, and <2, 1, 37, 12>. The memory addresses may include the same rank, bank group, bank, and row. Since the memory addresses include the same rank, bank group, bank, and row, a row hit may occur when the memory is accessed according to memory access requests (regardless of the column).

When there is one bank of a memory address included in a memory access request arriving at a host MC, timing parameters (e.g., tCCDI or the time delayed until accessing the same bank group after accessing a selected bank group) may occur while the host MC consecutively transmits memory access requests to the DIMM.

According to an example, the electronic device may select two or more banks from different bank groups. Further, the column-to-column delay between consecutive writes to two different bank groups may be smaller than the column-to-column delay between two consecutive writes to the same bank group. When two or more banks are selected from different bank groups, delay (e.g., tCCD or the delay occurring when alternately accessing different bank groups) shorter than delay (e.g., tCCDI) by access requests for the same bank group may occur when processing consecutive memory access requests.

For example, when the electronic device selects banks respectively from two bank groups, the electronic device may alternately access two or more banks while keeping the row of each bank group fixed according to the generated memory access request.

According to an example, the electronic device may select one or more columns so as to avoid write coalescing. In order to reduce the frequency of communication with the DIMM, data, and the like, the host MC may optimize write (store) operations by a method called "write coalescing". Using the write coalescing method, the host MC may consolidate multiple write requests/addresses which belong to consecutive column locations or byte offsets into a single request. Since the instructions for NMA operations are packed within memory (e.g., DRAM) write data, write coalescing may result in the loss of a packet of NMA instructions. The loss of a packet of NMA instructions may impact the functional correctness of NMA operations, and the like.

Hence, in generating write addresses for NMA, a column identity (e.g., column_ID), that is, at least one column may be selected appropriately to prevent the loss of a packet of NMA instructions according to write coalescing.

According to an example, when generating a column identity (e.g., col_ID) corresponding to the at least one column, the electronic device may generate a column identity that has a width greater than the width of a byte offset and is not repeated within a wraparound window.

For example, the electronic device may generate the increment of a column identity as temp_col_id++ and an actual column identity as col_id=temp_col_id<<log 2(byte_offset).

By the above method, the generated column identity may always be at least a byte offset (i.e., a write coalescing window) apart. Also, the wrap around (or the wrap around length) to the same column identity may be significant to avoid clashing on memory (e.g., DRAM) write addresses having the same column identity residing inside a write buffer.

The wrap around length may be determined to be (column length-log 2(byte_offset)). For example, if the byte offset is 8, log 2(byte_offset) may be 3(A[2:0]), and if the column length is 10, the wrap around length may be $2^{(10-3)}=128$.

As in the above example, the memory (e.g., DRAM) having a greater column length may have a greater wrap around length.

For example, when two banks are selected, the wrap around length may be applied independently to each selected bank. Hence the effective wrap around length may become twice the original wrap around length.

The electronic device may generate memory addresses of memory access requests, thereby reducing the shuffling of the memory access requests from the HOST MC and increasing the number of row hits experienced by NMA. As the number of row hits increases, memory access time may be reduced. Consequently, generating memory addresses of memory access requests according to various examples may improve the performance of NMA without having to modify the hardware design or configuration of the electronic device. Further, the method of generating memory addresses of memory access requests according to various examples may be less constrained and readily applied to each system.

Figure 5:
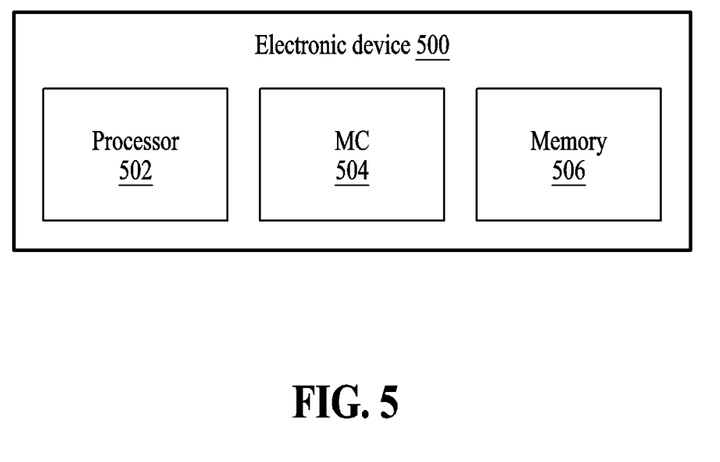
FIG. 5 illustrates an example electronic device, according to one or more embodiments.

FIG. 5 illustrates an example of an electronic device 500, according to one or more embodiments.

Referring to FIG. 5, the electronic device 500 may include a processor 502, an MC 504, and a memory 506.

For example, the memory 506 may include DIMM (e.g., the DIMM 103 of FIG. 1). The processor 502 may be connected to an NMA included in the DIMM 103 through the MC 504. The processor 502 may be connected with the memory 506 (e.g., DRAM) through the NMA and communicate with the memory 506.

The processor 502 may be a single processing logic or a plurality of logics, and may include a plurality of computing logics. The processor 502 may include one or more microprocessors 502, microcomputers, microcontrollers, digital signal processors 502, central processing logics, state machines, logic circuitries, and/or any electronic devices that manipulate signals based on operational instructions. The processor 502 may be configured to fetch and execute computer-readable instructions and data stored in the memory 506.

The electronic device 500 may include a rank selection logic, a bank group and bank selection logic, a channel selection logic, an array selection logic, and an address generation logic. The array selection logic may include a row selection logic and a column selection logic.

The logics may include routines, programs, objects, components, and data structures that perform predetermined tasks or implement data types. The logics may also be implemented as processors 502, state machines, logic circuitries, and/or any other electronic devices or components that manipulate signals based on operational instructions.

Further, the logics may be implemented in hardware, instructions executed by a processing logic, or by a combination thereof. The processing logic may include a computer, the processor 502, a state machine, a logic array, or any other suitable electronic devices capable of processing instructions. The processing logic may be a general-purpose processor which executes instructions to cause the general-purpose processor to perform required tasks, or the processing logic may be dedicated to performing required functions.

The logics may be machine-readable instructions (software) which, when executed by the processor 502/processing logic, perform any of the described functions.

The logics may be in communication with each other. For example, the logics may be part of the processor 502. As an example, the processor 502 may be configured to perform the functions of the logics.

The MC 504 may serve as a repository for storing data processed, received, and generated by the logics, the processor 502, the memory 506, and the like.

Figure 6:
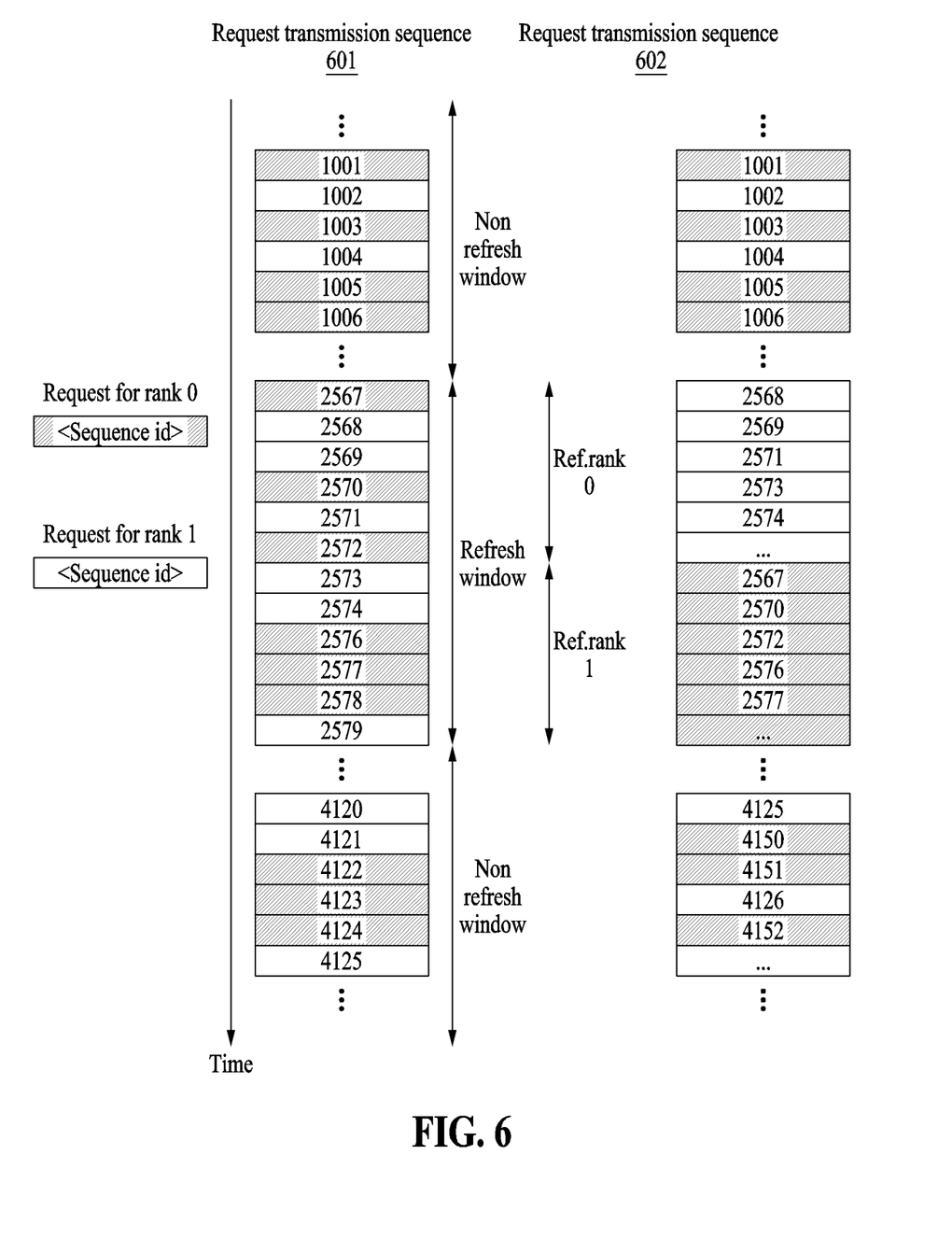
FIGS. 6 and 7 illustrate examples of selecting a rank of NMA instructions, according to one or more embodiments.
Figure 7:
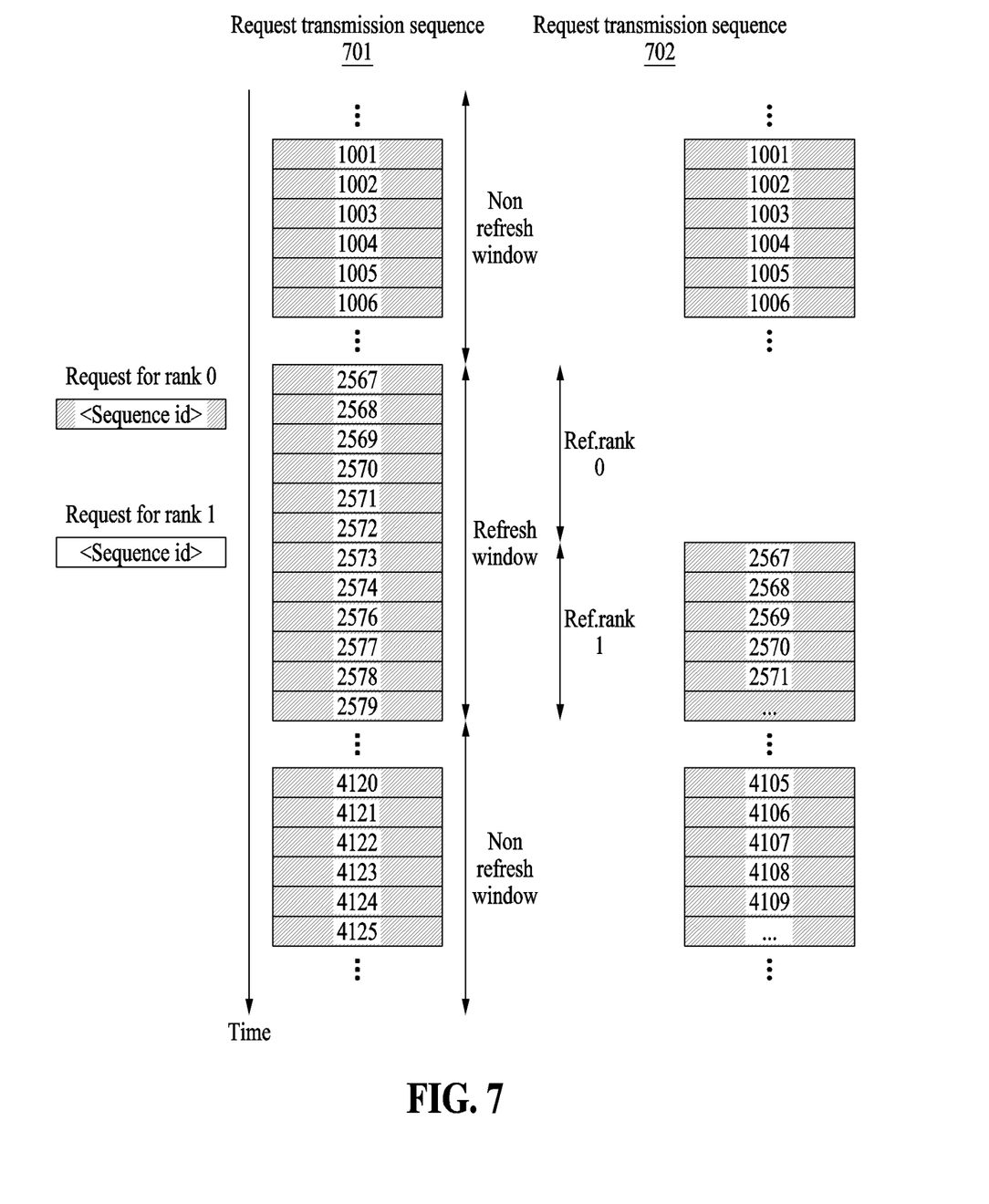

FIGS. 6 and 7 illustrate examples of selecting a rank of NMA instructions by the electronic device 500, according to one or more embodiments. NMA instructions may be referred to as memory access requests.

FIG. 6 illustrates a request transmission sequence 601 in which the processor 502 transmits memory access requests to the MC 504 and a request transmission sequence 602 in which the MC 504 transmits the memory access requests to the memory 506 (e.g., the DIMM 103) when the electronic device 500 selects a rank of the memory 506 (e.g., DRAM) corresponding to a memory address from a rank 0 and a rank 1.

FIG. 7 illustrates a request transmission sequence 701 in which the processor 502 transmits memory access requests to the MC 504 and a request transmission sequence 702 in which the MC 504 transmits the memory access requests to the memory 506 (e.g., the DIMM) when the electronic device 500 selects a rank of the memory 506 (e.g., DRAM) corresponding to a memory address as one of a rank 0 and a rank 1.

As shown in FIG. 6, it may be verified, when the processor 502 randomly selects a rank, the request transmission sequence 602 in which the MC 504 transmits the memory access requests to the memory 506 differs from the request transmission sequence 601 (in which the processor 502 transmits the memory access requests to the MC 504). For example, the MC 504 may shuffle the request transmission sequence 601 according to a scheduling algorithm and transmit the memory access requests to the memory 506 in the same sequence as the request transmission sequence 602.

As shown in FIG. 7, it may be verified, when the processor 502 selects a rank (the rank 0 in the case of FIG. 7), the request transmission sequence 602 in which the MC 504 transmits the memory access requests to the memory 506 is the same as the request transmission sequence 601 (in which the processor 502 transmits the memory access requests to the MC 504). For example, the MC 504 may transmit the memory access requests to the memory 506 in the request transmission sequence 602, which is the same sequence as the request transmission sequence 601, without shuffling the request transmission sequence 601.

As shown in FIG. 7, when the electronic device 500 selects one rank from a plurality of ranks, some time may be wasted due to a rank refresh delay. For example, if the rank 0 is selected from between rank 0 and rank 1, no memory access to rank 0 may be performed during refreshing of rank 0. That is, during a refresh window time for rank 0, memory access to rank 0 may be suspended, or no memory access to rank 0 may be performed.

However, when the rank of the memory access requests is fixed to 0 (when rank 1 is not used), the memory access requests may not be shuffled. Further, the wastage time (e.g., the refresh window time of rank 0) or idle cycle with respect to the overall time to transmit all memory access requests from the MC 504 (e.g., the host MC 102 of FIGS. 1 to 3) to the GB/instruction buffer 201 may be significantly reduced. Hence, when the electronic device 500 selects a rank, the MC 504 may not shuffle the memory access requests and may maintain the row buffer locality of the memory access requests generated by the processor 502, thereby reducing or improving the overall time to perform the memory access requests.

Figure 8:
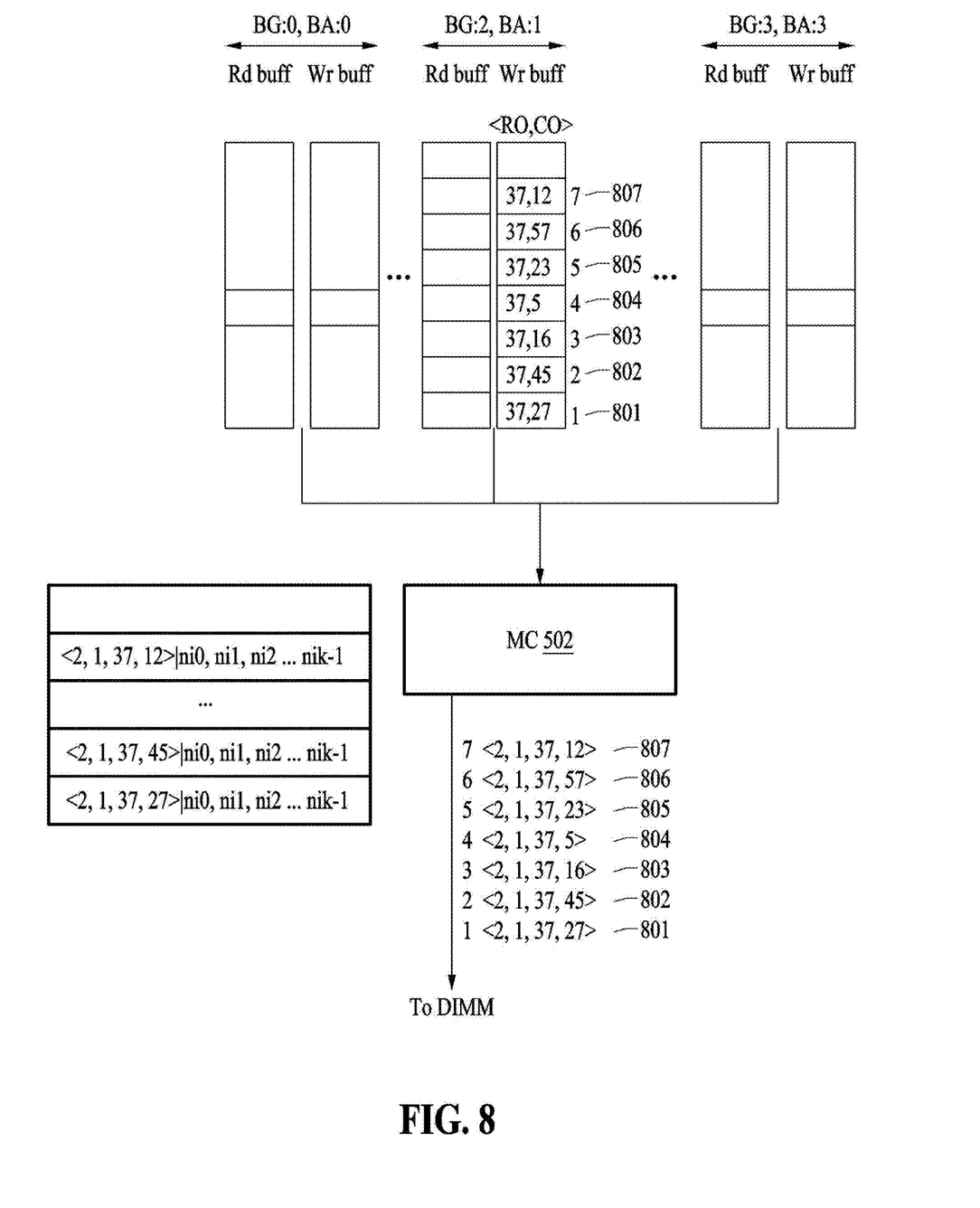
FIGS. 8 and 9 illustrate example operations for accessing a memory using an NMA, according to one or more embodiments.
Figure 9:
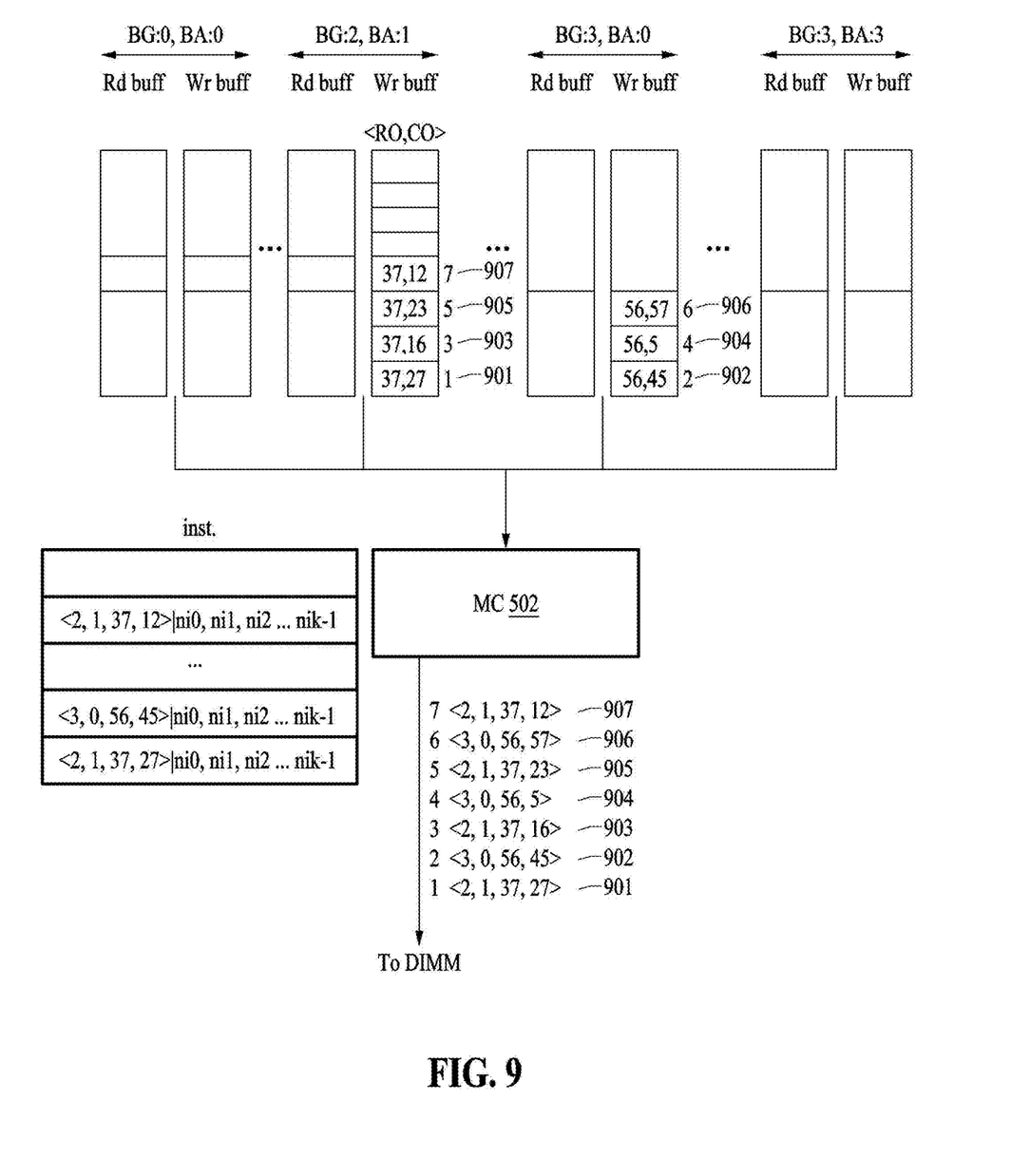

FIGS. 8 and 9 illustrate examples of operations of accessing the memory 506 using an NMA by the electronic device 500, according to one or more embodiments.

In FIG. 8, the electronic device 500 may generate memory addresses of memory access commands using a selected rank, a selected bank, a selected row, and one or more selected columns. For example, as shown in FIG. 8, the electronic device 500 may generate a first memory access request 801, a second memory access request 802, a third memory access request 803, a fourth memory access request 804, a fifth memory access request 805, a sixth memory access request 806, and a seventh memory access request 807. The memory addresses included respectively in the first to seventh memory access requests 801 to 807 may be <2, 1, 37, 27>, <2, 1, 37, 45>, <2, 1, 37, 16>, <2, 1, 37, 5>, <2, 1, 37, 23>, <2, 1, 37, 57>, and <2, 1, 37, 12>. A memory address may be <(bank group), (bank), (row), (column)>.

The MC 504 may receive the memory access requests in the sequence of the first memory access request 801, the second memory access request 802, the third memory access request 803, the fourth memory access request 804, the fifth memory access request 805, the sixth memory access request 806, and the seventh memory access request 807.

Since the memory addresses of the first to seventh memory access requests 801 to 807 are determined according to the selected rank, selected bank, and selected row, the MC 504 may transmit the first to seventh memory access requests 801 to 807 to the memory 506 in the sequence the same as the reception sequence.

Further, since the memory addresses have the same bank group, bank, and row, row hits may occur when the NMA accesses the memory 506 (e.g., DRAM).

As shown in FIG. 8, the electronic device 500 may select a row in such a manner that the row corresponds to a row hit for memory addresses (e.g., write addresses or read addresses) of memory access requests transmitted to the MC 504. In particular, the electronic device 500 may generate a row identifier (e.g., row_ID) for each of the memory access requests so that all the memory access requests correspond to row hits.

FIG. 9 shows memory access requests generated when the electronic device 500 selects a plurality of banks from different bank groups among a plurality of bank groups included in the selected rank. FIG. 9 shows an example in which the electronic device 500 selects a bank 1 (BA 1) of a bank group 2 (BG 2) and a bank 0 (BA 0) of a bank group 3 (BG 3).

The electronic device 500 may select a row for the bank group 2 and the bank 1 as a row 37 (RO 37) and select a row for the bank group 3 and the bank 0 as a row 56 (RO 56). A first memory access request 901 may correspond to the bank group 2, and a second memory access request 902 may correspond to a bank group 3.

Since the first memory access request 901 and the second memory access request 902 correspond to different bank groups, banks, and rows, row hits may not occur. However, the first memory access request 901 may correspond to the same bank group, bank, and row as a third memory access request 903, a fifth memory access request 905, and a seventh memory access request 907. Further, the second memory access request 902 may correspond to the same bank group, bank, and row as a fourth memory access request 904 and a sixth memory access request 906. Accordingly, row hits may occur by memory access requests subsequent to the first memory access request 901 and the second memory access request 902.

The MC 504 may transmit the memory access requests to the memory 506 in the sequence of the memory access requests input to the MC 504 according to a scheduling algorithm. For example, the MC 504 may receive the memory access requests in the sequence of the first memory access request 901, the second memory access request 902, the third memory access request 903, the fourth memory access request 904, the fifth memory access request 905, the sixth memory access request 906, and the seventh memory access request 907. The MC 504 may transmit the first to seventh memory access requests 901 to 907 to the memory 506 in the sequence the same as the sequence of reception. That is, the MC 504 may transmit the memory access requests to the memory 506 in the sequence the same as the sequence of reception without shuffling the memory access requests.

Although FIG. 9 shows an example of selecting two banks from two different bank groups by the electronic device 500, examples are not limited thereto. The electronic device 500 may select multiple banks in various manners, such as selecting four banks from four different bank groups.

The computing apparatuses, the electronic devices, the processors, the memories, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device comprising:
a processor; and
a memory electrically connected to the processor,
wherein the processor is configured to:
select, between a first rank and a second rank, a rank comprising bank groups of the memory,
select a bank corresponding to a memory address to be accessed from among banks included in the selected rank,
select a row and one or more columns from among rows and columns of the selected bank, and
generate the memory address to access the memory based on an address mapping scheme according to the selected rank, the selected bank, the selected row, and the selected one or more columns, wherein when the first rank is selected, reshuffling of an order of the generated address is prevented, and wherein when the second rank is selected, reshuffling of the order of the generated address is not prevented.

2. The electronic device of claim 1, wherein
the processor is further configured to select a channel to access a near memory accelerator (NMA) included in the memory, the channel selected from among channels connected to the memory.

3. The electronic device of claim 1, wherein
the processor is further configured to generate a column identity corresponding to the selected one or more columns, and wherein
a width of the column identity is greater than a width of a set byte offset, and the column identity is set such that it is not to be repeated within a set wrap around window.

4. The electronic device of claim 1, wherein
the selected row corresponds to a row hit for all write addresses.

5. The electronic device of claim 1, wherein
the processor is further configured to select banks from different bank groups among the bank groups included in the selected rank.

6. A method of accessing a memory, the method comprising:
selecting, between a first rank and a second rank, a rank comprising bank groups of a memory;
selecting a bank corresponding to a memory address to be accessed, the bank selected from among banks included in the selected rank;
selecting a row and one or more columns from rows and columns of the selected bank; and
generating the memory address to access the memory based on an address mapping scheme according to the selected rank, the selected bank, the selected row, and the selected one or more columns, wherein when the first rank is selected, reshuffling of an order of generated addresses, including the generated address, is prevented, and wherein when the second rank is selected, reshuffling of the order of the generated addresses is not prevented.

7. The method of claim 6, further comprising:
selecting a channel to access a near memory accelerator (NMA) included in the memory, from among channels connected to the memory.

8. The method of claim 6, further comprising:
generating a column identity corresponding to the selected one or more columns, wherein
a width of the column identity is greater than a width of a set byte offset, and the column identity is set not to be repeated within a set wrap around window.

9. The method of claim 6, wherein
the selected row corresponds to a row hit for all write addresses.

10. The method of claim 6, wherein
the selecting of the bank comprises selecting banks from different bank groups among the bank groups included in the selected rank.

* * * * *